US012705931B2

(12) United States Patent
Zargari Khuzani et al.

(10) Patent No.: US 12,705,931 B2
(45) Date of Patent: Aug. 11, 2026

(54) SIGN-LANGUAGE TRANSLATION

(71) Applicant: Sorenson IP Holdings, LLC, Salt Lake City, UT (US)

(72) Inventors: Abolfazl Zargari Khuzani, Campbell, CA (US); Naveen Kulkarni, Folsom, CA (US); Mariam Rahmani, Folsom, CA (US); Shashank Bujimalla Venkata Sesha, Portland, OR (US); Abolfazl Ravanshad, Redwood City, CA (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 276 days.

(21) Appl. No.: 18/398,902

(22) Filed: Dec. 28, 2023

(65) Prior Publication Data

US 2025/0218223 A1 Jul. 3, 2025

(51) Int. Cl.
*G06V 40/20* (2022.01)
*G06V 10/80* (2022.01)
*G06V 20/40* (2022.01)

(52) U.S. Cl.
CPC ............ *G06V 40/28* (2022.01); *G06V 10/809* (2022.01); *G06V 20/41* (2022.01); *G06V 20/49* (2022.01)

(58) Field of Classification Search
CPC ...... G06V 40/28; G06V 10/809; G06V 20/41; G06V 20/49; G06F 40/58; G09B 21/04
See application file for complete search history.

(56) References Cited

U.S. PATENT DOCUMENTS 8,751,215 B2 * 6/2014 Tardif ..................... G06F 3/017 704/4
10,885,320 B2 * 1/2021 Rangarajan ............ G06V 40/28
2014/0316763 A1 * 10/2014 Tardif ..................... G06F 40/44 704/3
2016/0307469 A1 * 10/2016 Zhou ....................... G06F 3/017
2019/0050637 A1 * 2/2019 Mahmoud .............. G06V 40/28
2019/0251344 A1 * 8/2019 Menefee .............. H04N 13/239
2020/0005028 A1 * 1/2020 Gu .......................... G10L 13/00
2020/0034609 A1 * 1/2020 Chandler ............. G06V 10/764
2020/0192982 A1 * 6/2020 Luqman .................. G06F 40/30

(Continued)

FOREIGN PATENT DOCUMENTS

CN 110472548 A * 11/2019 ............. G06N 3/045
CN 110532912 A * 12/2019 ........... G06F 18/241
CN 112257513 A * 1/2021 ........... G06F 18/214

OTHER PUBLICATIONS

"A Transformer-Based Contrastive Learning Approach for Few-Shot Sign Language Recognition" by Silvan Ferreira et al. published in 2022, arXiv:2204.02803 [cs.CV], available at https://doi.org/10.48550/arXiv.2204.02803 (Year: 2022).*

(Continued)

*Primary Examiner* — Henok Shiferaw
*Assistant Examiner* — Woo C Rhim
(74) *Attorney, Agent, or Firm* — Maschoff Brennan

(57) ABSTRACT

System and techniques to facilitate the translation of a sign language into another language are described herein. A modular architecture may be used in which the output of different classifiers may be used to produce intermediate representations, or final translations, of the sign language. These classifiers may be trained on different types of signs to enhance accuracy while reduce training time and complexity.

20 Claims, 8 Drawing Sheets

(56) References Cited

U.S. PATENT DOCUMENTS

| | | | | |
|---|---|---|---|---|
| 2022/0327309 | A1* | 10/2022 | Carlock | G09B 21/009 |
| 2022/0327961 | A1* | 10/2022 | Kelly | G09B 21/04 |
| 2022/0414350 | A1* | 12/2022 | Jang | G06F 40/58 |
| 2023/0085161 | A1* | 3/2023 | Rahmani | G09B 21/009<br>704/235 |
| 2023/0095895 | A1* | 3/2023 | Decrop | G06N 3/04<br>704/9 |
| 2023/0316952 | A1* | 10/2023 | Peralta | G10L 13/027<br>704/271 |
| 2023/0343011 | A1* | 10/2023 | Kelly | G06T 13/40 |
| 2024/0070405 | A1* | 2/2024 | Retek | G06F 40/205 |
| 2024/0106776 | A1* | 3/2024 | Livne | G06F 40/126 |
| 2025/0005351 | A1* | 1/2025 | Chandler | G06N 3/0442 |
| 2025/0022265 | A1* | 1/2025 | Chandler | H04N 23/90 |
| 2025/0078575 | A1* | 3/2025 | Magalhães | G06V 10/764 |
| 2025/0078576 | A1* | 3/2025 | Luqman | G06V 10/82 |
| 2025/0218223 | A1* | 7/2025 | Zargari Khuzani | G06V 40/28 |

OTHER PUBLICATIONS

International Search Report and Written Opinion, as issued in connection with International Patent Application No. PCT/US2024/062168, dated April 2, 2025

Silvan Ferreira et al., "A Transformer-Based Contrastive Learning Approach for Few-Shot Sign Language Recognition", arxiv.org, Cornell University Library, Ithaca, New York, April 5, 2022.

Mathur Aeshita et al., "Recognition of American Sign Language using Deep Learning", 2021 International Conference on Industrial Electronics Research and Applications (ICIERA), IEEE, Dec. 22, 2021 (Dec. 22, 2021), pp. 1-5.

Shi Bowen et al., "Fingerspelling Detection in American Sign Language", 2021 IEEE/CVF Conference on Computer Vision and Pattern Recognition (CVPR), IEEE, June 20, 2021 (June 20, 2021), pp. 4164-4173.

* cited by examiner

SIGN-LANGUAGE TRANSLATION

BACKGROUND

Sign language is a visually oriented language primarily used by deaf and hard-of-hearing individuals for communication. Unlike spoken languages, which rely on auditory and vocal elements, sign languages exploit manual gestures, facial expressions, and body postures to convey meaning. These gestures include a combination of hand shapes, orientations, locations relative to the body, and movements, all integral to forming signs. Each sign language, such as American Sign Language (ASL), British Sign Language (BSL), or others, has its own unique grammar and syntax, distinct from the spoken language of the surrounding hearing population. In the study and documentation of sign languages, a "gloss" refers to a written or typed approximation of a sign. Glosses are used to transcribe and analyze sign language. They do not capture all the nuanced elements of the sign, such as facial expressions or movements, but provide a basic reference for the handshape or action. Accordingly, glosses are not direct translations of signs into spoken language but rather closer to a descriptive aid or a form of shorthand notation.

A neural network is a computational model inspired by the structure and functioning of biological neural networks, primarily used in the field of machine learning and artificial intelligence. Generally speaking, a neural network has of layers of interconnected nodes, called neurons. These neurons process input data, transmit signals to other neurons, and produce output. The strength of these connections, or weights, is adjusted during the training process to optimize the network's performance for specific tasks.

Neural networks come in various architectures that may be more appropriate for different types of data and tasks. For example, Feedforward Neural Networks (FNNs) are the simplest type of neural network where the connections between the nodes do not form a cycle. FNNs may be used for general prediction and classification tasks. Recurrent Neural Networks (RNNs) and designed for processing sequential data, such as time series or text. RNNs have connections that form cycles, allowing them to maintain a form of 'memory' of previous inputs. Convolutional Neural Networks (CNNs) are usually used in image processing and computer vision. CNNs employ a mathematical operation called convolution which enables them to efficiently process data with a grid-like topology, such as images. Long Short-Term Memory Networks (LSTMs) are a special kind of RNN with a facility to learn long-term dependencies. LSTMs are useful in language modeling and other sequence tasks. Generative Adversarial Networks (GANs) use two networks, a generator and a discriminator, which are trained simultaneously. GANs are often used in image generation and style transfer. Transformers (e.g., Transformer Networks) use a self-attention mechanism. The transformer architecture is a model that has been successful in natural language processing (NLP), such as in large language models (LLMs).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Translating a sign language, such as American Sign Language (ASL), from video to a comprehensive sequence of sign labels, encompassing the broad spectrum of single signs, fingerspelled signs, and regular ASL signs, is a difficult task due to a unique set of complexities stemming from the dynamic and visual nature of sign languages. A single sign in ASL is a complete gesture that represents a whole idea or word, a fingerspelled sign is a sequence of hand movements that spell out individual letters of a word, particularly used for names or words without a dedicated sign, and a regular sign refers to the conventional, non-fingerspelled signs that make up the core vocabulary of ASL.

Historically, various methods have been employed to tackle these issues to varying degrees of success. For example, manual annotation uses human interpretation and transcription of signs into text, a process fraught with potential for error and inefficiency. Single classifier models have attempted to recognize all sign types, for a given language, using a unified machine learning model, but often failed to accurately differentiate between the diverse sign categories due to distinct features between categories. Rule-based systems, while effective for recognizing a predefined set of signs, lacked the adaptability to account for individual variations or regional dialects in sign language. And, static image-based systems, focusing solely on still images, were unable to capture the essential motion and evolving hand shapes characteristic of ASL, thus falling short in accurate interpretation.

To address the issues noted above, a modular sequential classifier may be used. The modular sequential classifier uses multiple classifiers (e.g., integrates four distinct classifier models) that are tailored to translate specific types of signs from video into a sequence of labels. By adopting a modular structure, single signs, fingerspelled signs, and regular signs are effectively segregated and processed, thereby enhancing the precision of sign count estimation within a sequence. By focusing on the unique attributes of each sign type, marked enhancements to overall translation accuracy may be achieved. Additional details and examples are provided below.

Figure 1:
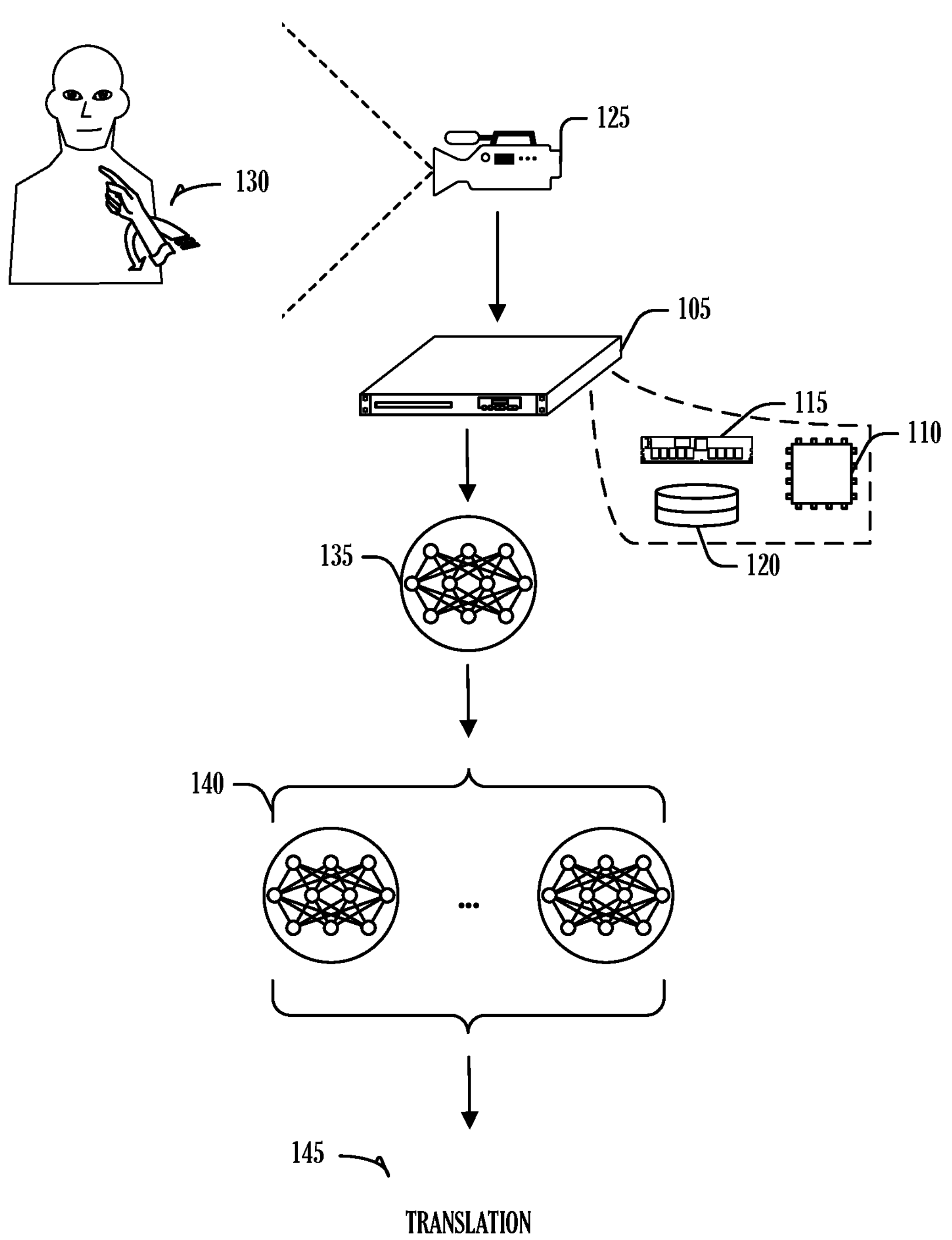
FIG. 1 is a block diagram of an example of an environment including a system for sign-language translation, according to an embodiment.

FIG. 1 is a block diagram of an example of an environment including a system 105 for sign-language translation, according to an embodiment. The system 105 includes processing circuitry 110 (e.g., a central processor unit (CPU), GPU, etc.), storage 120 (e.g., a hard drive, solid-state drive, storage class memory, etc.), and working memory 115 (e.g., volatile random access memory (RAM)). For clarity, the following examples use the controller as the entity effectuating the techniques, however, other combinations of hardware or software may be used, such as a cloud service, cluster, etc.

The processing circuitry 110 is configured to obtain (e.g., retrieve, receive, etc.) a video segment—e.g., via a camera 125 through an interface of the system—that captures a sign 130 in a sign language. The video segment may be manipulated in several ways to enhance sign recognition by downstream classifiers. In an example, the processing circuitry 110 is configured to perform brightness or contrast enhancement. This may improve the visibility of the signer's movements to aid in more accurate feature extraction. In an example, the processing circuitry 110 is configured to remove non-useful frames of the video segment. In an example, the processing circuitry 110 is configured to apply one or more visual augmentation functions. Examples of these functions may include flipping, cropping, zooming, adding noise, adjusting speed, resizing features (e.g., hands, faces, etc.) or rotating features. In an example, a pose model, such as Mediapipe, may be used to extract joint key points that are provided with the video segment to enhance the ability to detect finger, arm, or head positions for the sign 130.

The processing circuitry 110 is configured to invoke (e.g., apply, use, run, execute, etc.) a first classifier 135 to determine whether the video segment includes a sequence of signs or a single sign. Here, a sequence of signs refers to distinct signs that, when combined, have a single meaning. In an example, the first classifier 135 is trained only with various classes of discrete single signs in addition to a large category encompassing sign sequences. Thus, the first classifier 135 determines that there is a sequence if, for example, a single sign is not recognized within a threshold confidence level. In an example, the first classifier 135 accepts the skeletal key points (described above) as input alone or in combination with the video segment. In an example, if it is determined that the video segment has a single sign, the first classifier 135 outputs a symbol for that single sign. As noted below, the translation 145 is based on such produced symbols.

If it is determined that the video segment has a sequence of signs, a set of classifiers 140 is used to process the video segment to produce a sequence of symbols for the signs, including the sign 130, in the video segment. Classifiers in the set of classifiers 140 are trained for specific types of signs, such as fingerspelled signs or regular signs. To facilitate the operation of these classifiers, the set of classifiers 140 may include helper classifiers, such as a second classifier that is trained to predict the probable count of discrete signs within a sequence of signs. In an example, a segment proposal generator may use this information to divide the video segment into proposed parts, each potentially corresponding to individual discrete signs. The processing circuitry 110 is configured to invoke a third classifier to the parts to produce a first label for the sign 130. In an example, the third classifier is trained on regular continuous signs. In an example, the third classifier is trained only with regular continuous signs. This specialization for regular continuous signs enables the third classifier model to be trained separately with specialized data. This approach enhances the classifier's performance by customizing its training to the specific challenges, such as the signing speed, duration, and visual characteristics of regular signs, without the inclusion of other sign types. Similarly, the processing circuitry 110 is configured to invoke a fourth classifier is applied to the parts to produce a second label for the sign 130. In an example, the fourth classifier trained on fingerspelled signs. In an example, the fourth classifier is trained only with fingerspelled signs.

Figure 5:
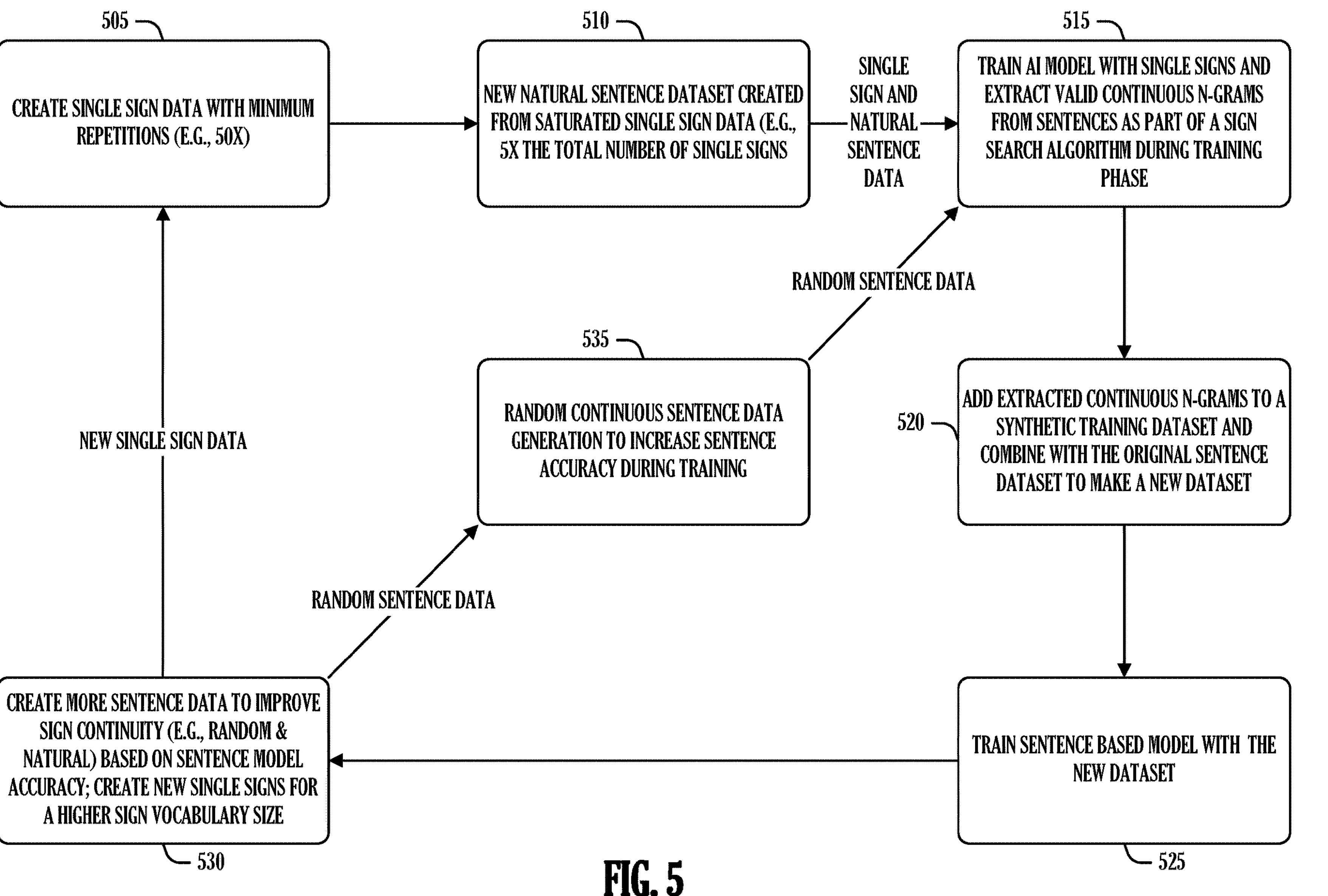
FIG. 5 illustrates an example of a continuous training cycle that incorporates synthetic data, according to an embodiment.

The training of the classifiers in the set of classifiers 140, or the first classifier 135, may use traditional techniques, such as labeled samples of training data. In an example, to expand the examples, synthetic training data may be generated for the different training sets used to train these classifiers. Synthetic training data involves the generation of training data by simulation, by modification of organic training data, or by combinations of the two. FIG. 5 illustrates a procedure for generating and using synthetic training data and additional details are provided below.

The processing circuitry 110 is configured to merge the outputs from the set of classifiers 140 to produce the translation 145. Thus, in an example, where a first label is created by the third classifier and a second label is created by the fourth classifier for the sign 130, the processing circuitry 110 is configured to merge the first label and the second label into a single label for the sign 130. In an example, the symbol is a gloss. Thus, the procedure may be called a sign-to-gloss recognition. In an example, merging the first label and the second label includes selecting a label that indicates a detection when another label indicates no detection or selecting a label with the highest confidence score. For example, if the third classifier output indicates that there is no fingerspelled sign detected, and the fourth classifier output indicates the sign for love, then the merged label is love. Otherwise, whichever of the first label or the second label has a higher confidence score, that is the merged label.

Figure 6:
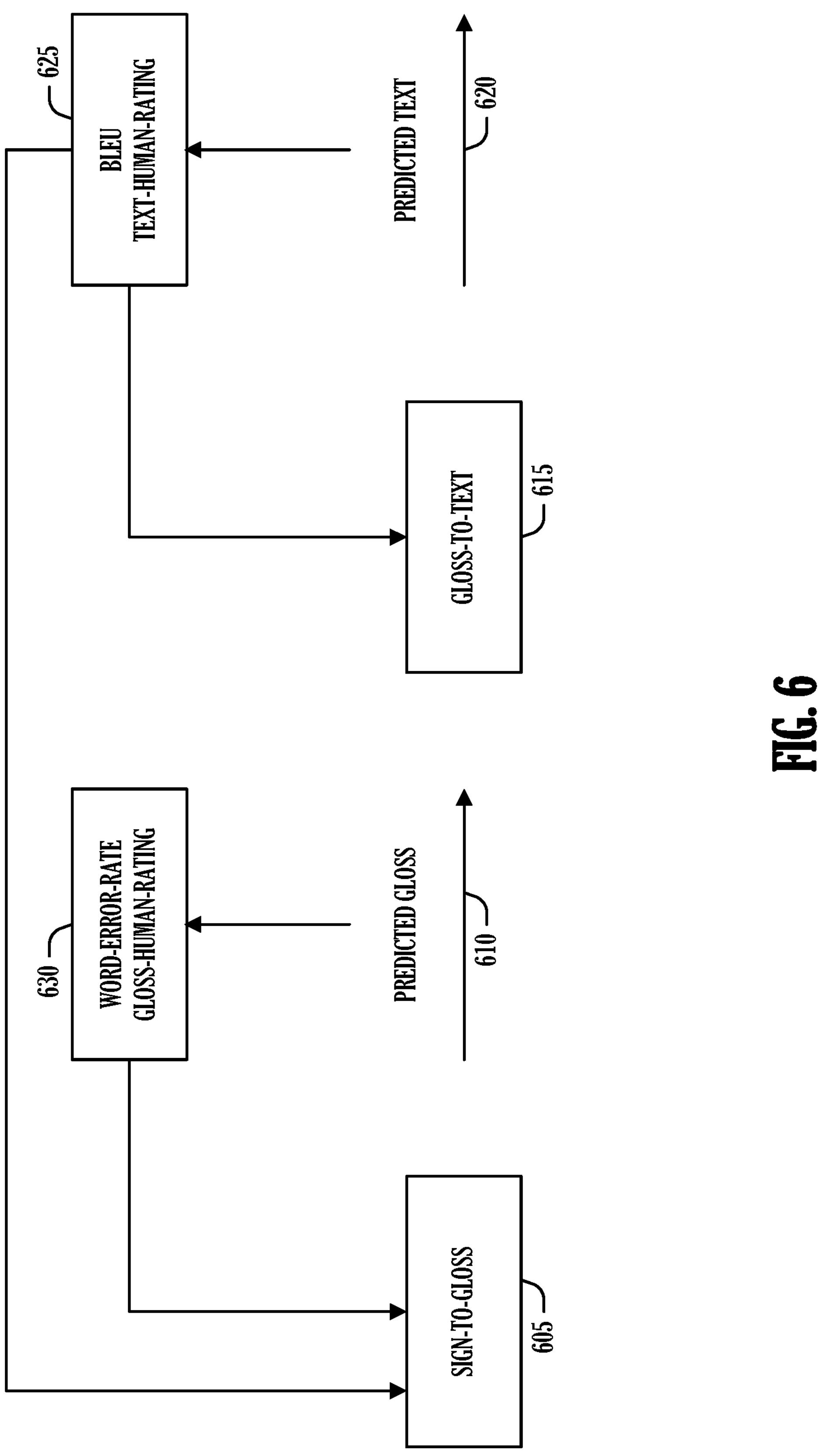
FIG. 6. Illustrates an example of an arrangement for reinforcement learning, according to an embodiment.

Although the translation 145 may be a sequence of symbols (e.g., glosses) for the sequence of signs, as noted above, such a translation 145 would be relatively crude and often fails to convey the meaning of a signed sentence. Accordingly, the processing circuitry 110 may invoke a transformer (e.g., LLM) to perform a gloss-to-text version of the translation 145. There is an opportunity to enable a feedback mechanism between the sign-to-gloss recognition and gloss-to-text translation. An example of such as mechanism is illustrated in FIG. 6 and described below.

Recognizing the complexity of sign language and the limitations of pre-trained AI models in capturing every possible sign a user might need, customized signs enable users to add or modify signs. This feature may be useful for unique personal names, typically fingerspelled, enabling users to create shortcut signs for ease of communication. An issue with custom signs arises from the resource-intensive nature of full model fine-tuning for each user, which demands significant computational power and extensive storage for model parameters. A couple of approaches may be employed to address these issues. For example, the processing circuitry 110 may be configured to enable users to save videos of their custom signs along with corresponding labels. These samples may form the basis for personalizing the AI model. In an example, to enhance the robustness of the models, these videos may be augmented to include for spatial or temporal variations.

In an example, the processing circuitry 110 is configured to present controls (e.g., one or more user interfaces) to the user that enable the user to control how personalized signs are integrated within their AI model, in, for example, an individual profile stored in the storage 120. Depending on preference, the profile may dictate that there is no AI model fine-tuning, but rather reliance on feature vector comparison of existing signs is used. In an example, the profile dictates the use of Parameter Efficient Fine-Tuning (PEFT). This technique is particularly efficient because only a few parameters of existing models are modified. These parameters may be stored in the profile, specific to each user, thereby avoiding the extensive resource demands of full model fine-tuning.

In an example, an implementation may include modifying the deep learning model architecture, such as a transformer model, to facilitate user customization. In an example, such modification may include introducing placeholder vocabulary labels and adapting the model architecture to support PEFT. In an example, techniques—such as Adapter or LoRa—may be used that allow for efficient fine-tuning without altering the original model architecture or parameters. This ensures both storage and computational efficiency.

In an example, the first classifier 135 and any in the set of classifiers 140 (e.g., the third classifier or the fourth classifier) are configured to recognize custom signs. In an example, a custom sign replaces a standard sign of the sign language. In an example, the custom sign is a new sign. In an example, the second classifier is trained with a few-shot technique to recognize the new sign.

Figure 2:
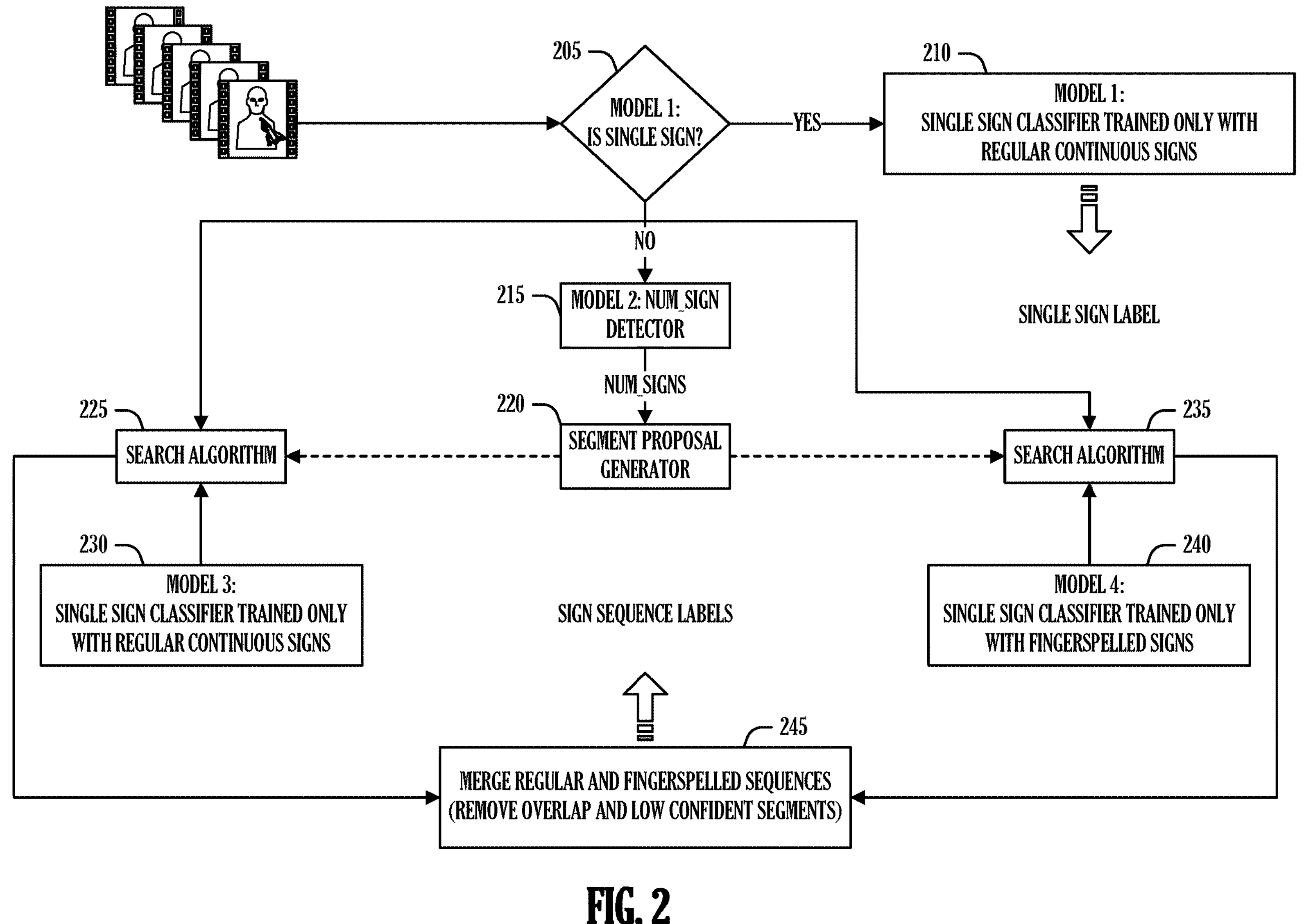
FIG. 2 illustrates an example of a modular sequential classifier system, according to an embodiment.

FIG. 2 illustrates an example of a modular sequential classifier system, according to an embodiment. In operation, to address the issue of visual feature extraction, a pre-trained pose model—which generates sequences of whole-body skeletal key points from video frame sequences—may be used. This ensures the model focuses on motion features most relevant for ASL interpretation, thereby reducing noise from unrelated visual features. These extracted key point sequences may be passed through a sequence of classifier models. The first model 205, a single sign classifier, determines if the input sign is a standalone sign or part of a sequence. If the input sign is a single sign, the sequence bypasses all subsequent operations and outputs the label for the sign as the final result 210.

If the input sequence represents a sequence of signs, the input sequence is fed to two distinct classifiers: a regular sign classifier (model 230) and a fingerspelled sign classifier (model 240). These classifiers are trained to identify regular signs and fingerspelled signs in the sequence, respectively, marking signs from the other category as —NONE— (e.g., indicating that no sign is found). A merge 245 is applied to the outputs of both classifiers to replace-NONE-labels with detections from the other model. In cases of sign position overlap, the merge 245 retains the sign detected with the highest confidence. An improvement may include using the num_sign detection model 215 to estimate the number of ASL signs in an input sequence. This may be used in a video segment proposal generator 220 and also improves the accuracy of the search algorithms (e.g., search algorithm 225 and search algorithm 235) used in the regular model 230 and the fingerspelled sign model 240.

The illustrated approach is modular, separating the tasks of the different classifiers, enabling each model to be trained individually with specialized training data. This strategy improves overall system performance by tailoring the model training to the unique complexities, signing speed, length, or visual features of each sign type.

Figure 3:
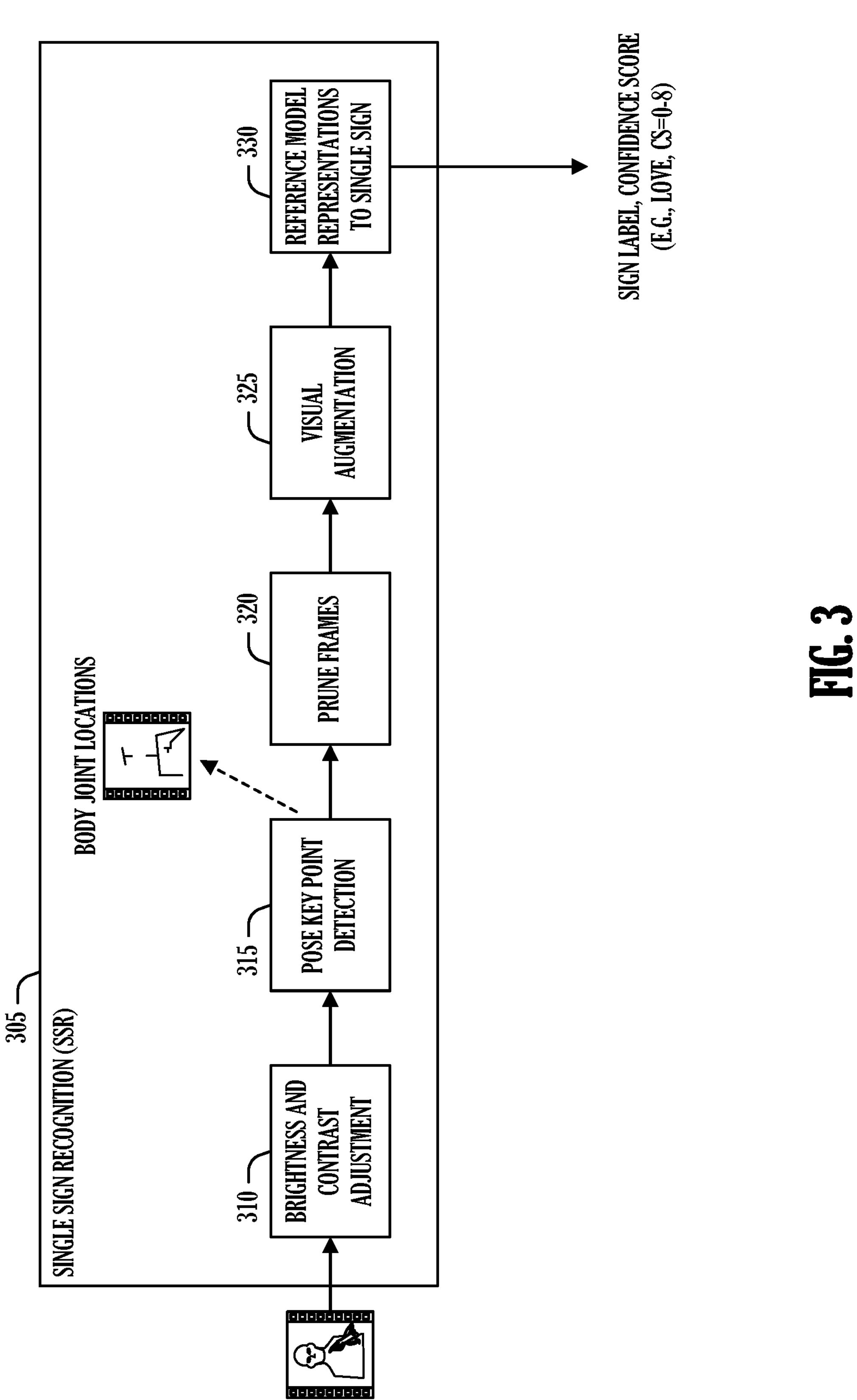
FIG. 3 illustrates an example of a technique to train a single sign classifier, according to an embodiment.

FIG. 3 illustrates an example of a technique to train a single sign classifier—which may be called a sign-to-gloss recognition model or single sign recognition model—(e.g., training pipeline 305), according to an embodiment. The illustrated sequence of stages may be used to train a variety of sign classifiers. These stages help to improve model accuracy and generalizability. For example, stage 310 facilitates better extraction of visual features by enhancing the brightness or contrast of the input video frame. Stage 310 improves the visibility of the signer's movements, thereby aiding in more accurate feature extraction.

Stage 315 uses a pre-trained feature extraction model, (e.g., Mediapipe) to extract the body joints of the signer that are most correlated with ASL motions. This model filters out non-useful background features and artifacts, thereby focusing on the most pertinent features for ASL interpretation. The usage of a pre-trained model significantly increases the accuracy of the sign recognition part compared to previous models.

Stage 320 removes non-useful frames. Here, frames where the signer has not yet started the ASL sign are removed. The process waits until the signer raises their hand and begins signing in ASL. This approach ensures only frames with a valid ASL sign are processed, which helps the model being trained avoid confusion from non-ASL movements by the signer.

Stage 325 applies visual augmentation functions. To improve model generalization during the training process, several visual augmentation functions may be applied to the key points. These functions may include flipping, rotating, skewing, cropping, zooming, adding noise, adjusting speed, removing frames, resizing hands, resizing faces, etc. Each function introduces a form of variability that enables the model to learn and generalize better across diverse input variations. For example, the flipping function helps the model to recognize signs made with either hand, the speed adjustment function enables the model to account for variations in signing speed, and the face resizing and rotation functions help to ensure that the model is able to interpret signs accurately regardless of the signer's face size or orientation.

Stage 330 performs the model training. An ASL single sign recognition model, which may be transformer-based, is trained with a certain amount of ASL single sign videos and the key points. This trained sign recognition model takes as input the key points of a single sign video and outputs a gloss label with a confidence score (CS) ranging from 0 to 1. The most confident recognition achieves a CS of 1.

These stages collectively contribute to the creation of robust and accurate single sign classifiers. They provide high translation accuracy by addressing the unique characteristics and complexities associated with ASL interpretation.

The issue of training raises the previously mentioned issue of custom signs. Allowing users to add or modify signs on top of a trained AI model, that is stored in their own user profile, may be very useful to the user because sign language is complex, and the trained AI model may not have all signs that a user wants to use. Also, users may want to customize the model as per their own signing or create new shortcut signs. For example, a user may wish to have custom signs for their own names or those of people they know. Names are often fingerspelled. However, full model fine-tuning for each user is expensive, both in terms of compute need for training and also storage needed for the model parameters. Accordingly, the following techniques enable user customization (e.g., personalization) of signs without performing full model fine-tuning.

In an example, individual users may start by saving videos of their custom signs along with corresponding labels. These are data samples that may be used to customize the model. In an example, the videos are augmented for spatial, or temporal variations to improve training data for the custom signs.

In an example, users may be provided with choices (e.g., via a user interface) on how or when these custom signs will be available in their custom model. User selections may be stored within a user profile. Based on user choices, model fine-tuning may not be performed; rather, a reliance on feature vector comparison may be used instead. However, in an example, parameter efficient fine-tuning may be used to save model parameters for each user if supported by the AI model architecture.

In an example, to implement custom signs, placeholder vocabulary labels for user customization (e.g., Usersign1, Usersign2, etc.) may be added during initial training. This enables the linear classifier layer to remain unchanged during fine-tuning.

To enable PEFT, Adapter layers, or LoRa layers, that do not alter the original model architecture or parameters, may be used. In an example, the PEFT layers may be added to a proper subset of self-attention layers instead of all layers of the model. The PEFT layers are the layers that are fine-tuned to customize the model per user. PEFT is a performant choice because PEFT is cheaper in storage for each user (e.g., store parameters for only few PEFT layers are stored, which may be in the megabyte range), PEFT is cheaper in training compute time or resources, and PEFT avoids catastrophic forgetting.

In an example, an existing sign label may be replaced with a new label. In this example, no model finetuning is needed. In an example, new signs that can used only as single signs (e.g., can't use them in sentences) may be added. Again, no model finetuning is needed. Rather, the user data samples are used to store feature vectors (e.g., from neural net output) for each custom sign. At inference, a custom algorithm compares the feature vector of the current sign with the feature vectors of the custom signs of the user to find a match. In an example, the inference is performed in parallel to generating the model translation. In case the distance between feature vectors is small, the custom sign accepted as the output instead of standard model translation.

In an example, a new sign that is usable in sentences may be added. Here, PEFT may be used to customize the standard model for the user. Placeholder labels may be replaced with new custom sign labels.

Figure 4:
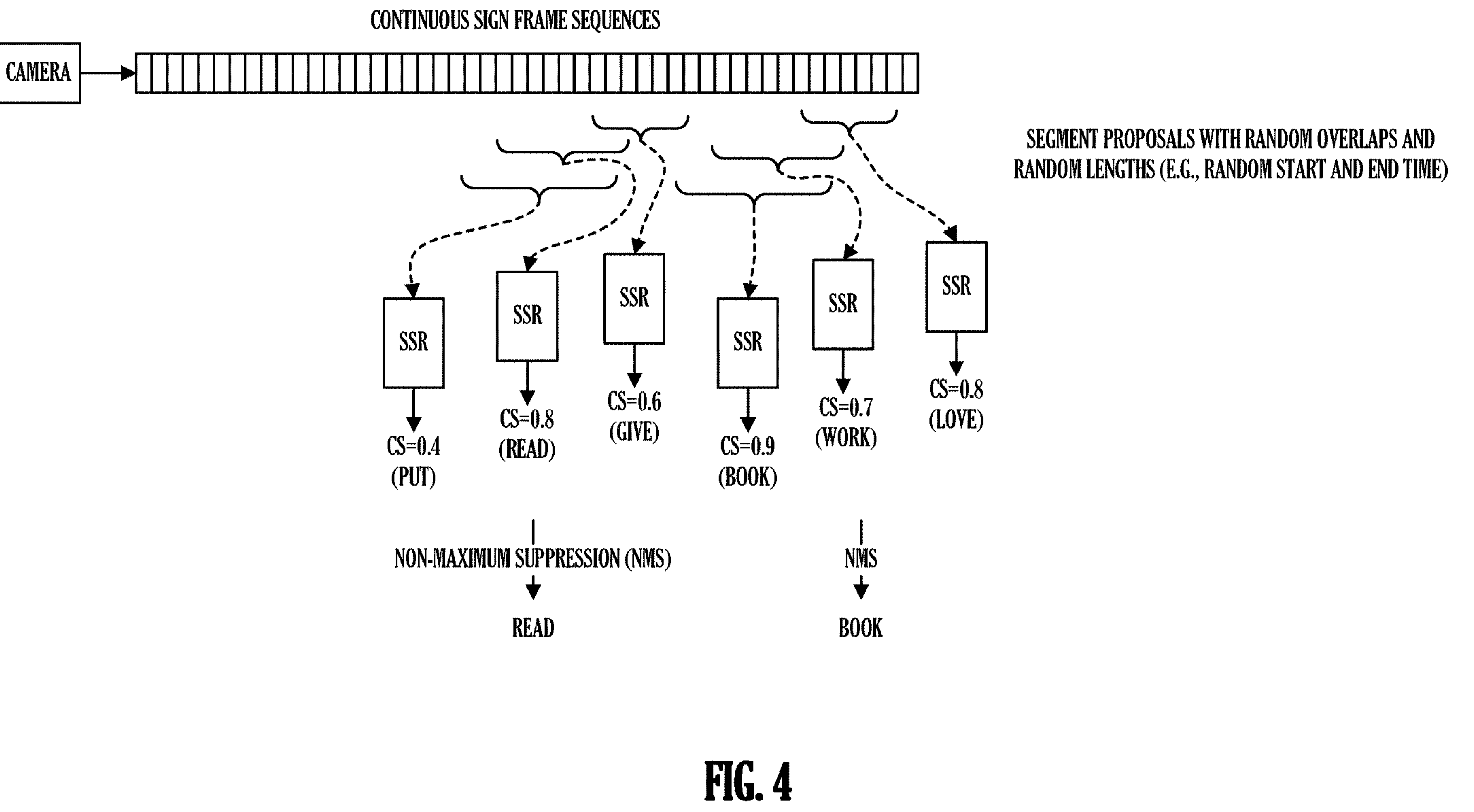
FIG. 4 illustrates an example of a selective sign search process, according to an embodiment.

FIG. 4 illustrates an example of a selective sign search process, according to an embodiment. The selective ASL sign search algorithm leverages a trained single sign recognition model to propose video segmentation by identifying the segments within a continuous sign video—which comprises a sequence of individual ASL signs—that most closely match (e.g., in terms of highest confidence score) the single signs used in the training process. The search technique be divided into several stages. Video segment proposal creation is an initial stage that involves generating a list of video segment proposals within the full-sentence continuous sign video frame sequence. These segment proposals, defined by their start and end points (e.g., times, frames, etc.), incorporate predefined segment overlaps (illustrated by the overlapping span elements under the frame sequences).

Proposal creation is guided by a segment proposal mechanism that is configured to use the number of signs estimation from a num_sign model (e.g., model 215 in FIG. 2) to better identify potential individual sign segments. The num_sign model also may be a classifier that is trained to take the sign video key points as the input and output an estimate of the number of ASL signs that might exist in the input video.

A second stage includes feeding into the single sign recognition. Here, once the list of video segment proposals is created, the key point arrays from each segment are fed into the trained single sign recognition model. This generates a corresponding set of gloss labels and confidence scores for each proposed segment.

In the third stage, a Non-Maximum Suppression (NMS) algorithm is employed to filter out the most confident video segments and eliminate those with low-confidence scores and overlaps. The NMS algorithm ensures that even in the presence of multiple overlapping detections, only the detection with the highest confidence score remains, leading to more accurate segmentation.

In the fourth stage, detected glosses are sorted. This stage includes sorting the detected glosses based on their location in the video. This results in a sequence of glosses that accurately reflect the order of signs in the original video.

By using this sequence of stages, individual signs within a sequence of ASL signs may be effectively identified and translated, catering to the inherent variability and complexity of sign language. This approach significantly enhances the overall accuracy and efficiency, making it a robust tool for real-time ASL translation.

FIG. 5 illustrates an example of a continuous training cycle that incorporates synthetic data, according to an embodiment. Sign language is a low resource language (LRL), a technical challenge in sign language translation. LRL means the data available for training ASL models is significantly smaller than other languages such as English, French, Spanish etc. The LRL nature of sign language imposes challenges to create training datasets to achieve high enough accuracy for a useful conversation between ASL speakers and speakers of other languages.

A variety of techniques have been tried to assist in the analysis of LRLs. For example, techniques using word level alignment or sentence level alignment by language experts have been performed. Sometimes document level alignment is done using sentence-based embedding for alignment in LRLs. However, these techniques are time consuming and expensive in terms of human interaction. These techniques are also prone to errors because language constructs may vary widely.

In an example, Parts of Speech (POS) tagging task has used clustering algorithms to map each word of an LRL to a cluster. There are also supervised learning methods for POS tagging however they have been very restrictive to related languages that are similar in nature and may not apply to LRLs in general. In an example, transfer learning techniques have been used to cope with lack of data of an LRL by learning to cope the differences between other languages and an LRL. However, this works well only if the high resource language and LRL have similar lexicon and grammar. This is typically not the case, particularly since the subject-verb-object formulation does not exist in a visual language like ASL.

To address these issues, the illustrated technique includes data collection, data generation, and data extraction from model training to produce quality training data. In overview, the technique may start with a simple single sign video data collection with a known prior repetition count to train a single sign classification model (operation 505). A natural ASL glossed sentence-based dataset is collected from the existing single sign vocabulary list (operation 510). A video search algorithm may be used to extract all the predicted n-grams from the above sentence-based test dataset (operation 515). A sentence-based model may be trained with original sentences training dataset and extracted n-grams (operation 525). Then, a synthetic sentence dataset of key points may be generated to simulate various combinations of a natural ASL glossed sentence (operation 530). This automatic generation process is complimentary to manual techniques used to generate ASL glossed sentences with the help of ASL signers. Synthetic sentence data may be added to the natural sentence dataset and the processes repeated (operation 535). The process is applicable to single signs, fingerspelled letters, and natural sentence data and their combination thereof.

In greater detail, it is worth noting that data is at the heart of any machine learned model. Sign language has some unique challenges because data takes different forms than in spoken or written languages. For example, an English sentence is comprised of letters, words, and sentences, while a sign could be represented as a fingerspelled letter or a word, an individual word, or a combination of them in a sentence. Solving many of the visual challenges involved in sign language recognition benefits from a unique approach towards how data is created and curated for model training.

An end goal of a sign language translator may include translating a signed video to a gloss representation and then to an English text. Such a goal may benefit from data collection targeted towards first maximizing the gloss translation accuracy followed by English translation accuracy with a Natural Language Processing (NLP) model. Signed video categorization is a complex task that starts with single sign video categorization (operation 505). This often uses a minimum (e.g., fifty times) repetition of the single signed videos. Together with these discrete single signs, signed sentence videos are collected using those existing single signed videos, for example with twenty times repetitions of each single sign overall in the sentence dataset (operation 510). An individual single sign within a sentence is referred to as a continuous single sign because it provides transitions between a previous and a next single sign in a sentence. The following are a few examples of single signs, fingerspelling, natural, and random sentences in Gloss and English format:

Single Signs:

[Gloss: please, English: please], [Gloss: perfectp, English: perfect]

Natural Fingerspelling:

[Gloss: ‘t’ ‘i’ ‘m’ ‘e’, English: time]

Random Fingerspelling:

[Gloss: ‘a’ ‘m’ ‘x’, English: amx]

Natural Sentence:

[Gloss: englishtap standardarc 15exico1515 for everyone knowbb,

English: 15exico15 is a common language for everyone to know]

Random Sentence:

[Gloss: transportation 15exico prettysym, English: transportation 15exico beautiful]

Once there are enough discrete single signs and sentence videos, a single sign AI model is trained for categorizing single sign videos while simultaneously evaluating the sentences using a video search algorithm (operation 515). The video search algorithm runs over a video segment with hundreds of random start and end points and obtains good classification accuracy for each individual gloss in a sentence. This heuristic method for individual sign recognition helps to extract synthetic continuous N-grams in a glossed sentence. These N-grams provide useful continuity information between two single signs. As a result, these N-grams are added back to the training dataset (operation 520) in the next round of model training (operation 525). An example of one such video segment output gloss is shown below with their corresponding prediction accuracy.

| | | | | | | | |
|---|---|---|---|---|---|---|---|
| Glossed Sentence: | Me | love | read | books | and | listen | music |
| English sentence: | I | love to | read | books | and | listen to | music |
| Accuracy of prediction | [0.88] | [0.83] | [0.45] | [0.78] | [0.65] | [0.79] | [0.85] |
| Glosses with >75% accuracy | [Me love] | | | [books] | | [listen music] | |

N-gram sets with >75% acc: [Me], [love], [Me love], [books], [listen], [music], [listen music]

1-gram continuous single signs added to single sign training: [Me], [love], [books], [listen], [music]

N-gram continuous signs added to sentence training: [Me love], [listen music]

The above example showcases how a glossed sentence may be used to identify many single signs of a signed video. Based on the accuracy of the final individual signs obtained using a video search algorithm, the results are split into 1-gram data and N-gram data. All the accurate 1-grams—also called continuous single signs—are added back to the training dataset for a single sign classifier. While all the N-gram subset sequences are added to a training dataset for sentence-based training (e.g., all N-gram sets with >75% acc).

A subsequent operation in data generation may depend on the final accuracy of the sentence-based model. Glosses that have low accuracy as compared to ground truth natural sentence data may be identified to determine which glosses need more continuous repetitions. Based on this statistic, a new set of random synthetic sentence data is generated using 1-gram continuous single signs (operation 530). A random glossed sentence may be generated, and linear interpolation used to generate a video sequence of key points of these individual glosses (operation 535). The interpolated video key points may be used as an input to a transformer encoder that, when used in conjunction with a ground truth natural sequence, learns to minimize errors between a continuous single sign interpolated sequence and ground truth natural sequence. This arrangement may use a dynamic time warping mean square error minimization as a metric to remove frame redundancies of an interpolated key point sequence to obtain a more natural continuous key point sequence of a synthetic glossed sentence. The automatic synthetic data generation augments the existing natural sentence data collection process.

At this juncture, discrete single signs, natural sentences from data collection, continuous single signs, continuous n-grams from video search algorithm extraction, and synthetic continuous sentence key point data generated from an AI model are created. This completes the first cycle of the loop. This diverse set of data collected, extracted, or generated reinforces the accuracy of previously trained single sign model and a sentence-based model in a second run of the loop. Specifically, in the second loop, a new vocabulary data set for single sign training is generated (operation 530). A set of natural sentences corresponding to the new single sign vocabulary is added to the existing dataset as well. The new data is combined with all the extracted and generated continuous N-grams and continuous sentence key point from the previous cycle, into a new assemblage that is used to complete the second loop. This cycle of data creation and training continues until a desired accuracy metric is reached.

The virtuous loop of ever-increasing dataset collection, generation, and extraction results in higher real-world accuracy and generalization in ASL to English translation. Such accuracy helps to bridge the communication gap between speakers of sign languages and speakers of other languages.

FIG. 6. illustrates an example of an arrangement for reinforcement learning, according to an embodiment. As noted above, automated sign language translation may be separated into two phases; the sign-to-gloss phase 605 and the gloss-to-text phase 615. The sign-to-gloss phase 605 is the translation of the visual sign language to one or more glosses (e.g., a sequence of glosses) (e.g., the predicted gloss 610). The gloss-to-text phase 615 translates the sequence of glosses into another language (e.g., the predicted text 620).

This two-phased arrangement may introduce some issues. The two phases are traditionally trained independently, without any end-to-end optimization. This lack of interconnected training means that potential corrections or feedback from the gloss-to-text phase 615, which could refine the sign-to-gloss phase 605, are not used. Moreover, there is a discrepancy between the metrics used for training the AI models and those for evaluating their output. While training often employs cross-entropy loss, evaluation usually uses automated metrics like Word Error Rate (WER) 630, Bleu 625, or human beings. Each evaluation method has its merits and drawbacks. Automated metrics provide immediate, objective results but may not prioritize the contextual importance of words in a sentence. In contrast, human ratings offer a subjective, nuanced understanding of the translation's quality but are resource intensive (e.g., time-consuming, expensive) to gather.

To address these issues, a finetuning approach that incorporates all these evaluation metrics, focusing on an end-to-end optimization of both the sign-to-gloss and gloss-to-text models may be used. The conventional hurdle in this technique is the non-differentiability of evaluation metrics; differentiability being important for gradient descent techniques used in back-propagation training of neural networks. A reinforcement learning (RL) technique may be used to address this last point. That is, AI models that are trained using regular loss functions—such as log loss likelihood—are fine-tuned using the metrics that are used to evaluate the AI model (e.g., both automated metrics and human ratings). Models for sign-to-gloss and gloss-to-text are tuned together using these metrics to perform end-to-end optimization. RL overcomes issues of non-differentiability of these metrics during gradient descent operations of training.

In an example, the gloss-to-text phase 615 and the sign-to-gloss phase 605 are trained use traditional techniques. The training may be independent of each other and thus performed in parallel. In an example, the sign-to-gloss phase 605 is evaluated using WER 630 because this is a recognition task. In an example, the gloss-to-text phase 615 is evaluated using Bleu 625 because this is a translation task.

One may begin with the sign-to-gloss phase 605 to ensure quality glosses are produced. To fine-tune the sign-to-gloss phase 605, a reward function that combines human feedback and metrics like WER 630 or Bleu 625 are used. For example, a translation may be periodically provided to human evaluators to produce a quality rating. The quality rating may then be combined with the automated metrics to generate a composite reward. The composite reward may then be used to fine tune the sign-to-gloss phase 605. Once complete, the sign-to-gloss phase 605 may be frozen (e.g., unchanged or fixed) while the gloss-to-text phase 615 is tuned. The fine-tuning of the gloss-to-text phase 615 also uses the composite reward-based on human feedback and automated metrics. This results in an end-to-end fine-tuning using the composite reward for guidance.

Figure 7:
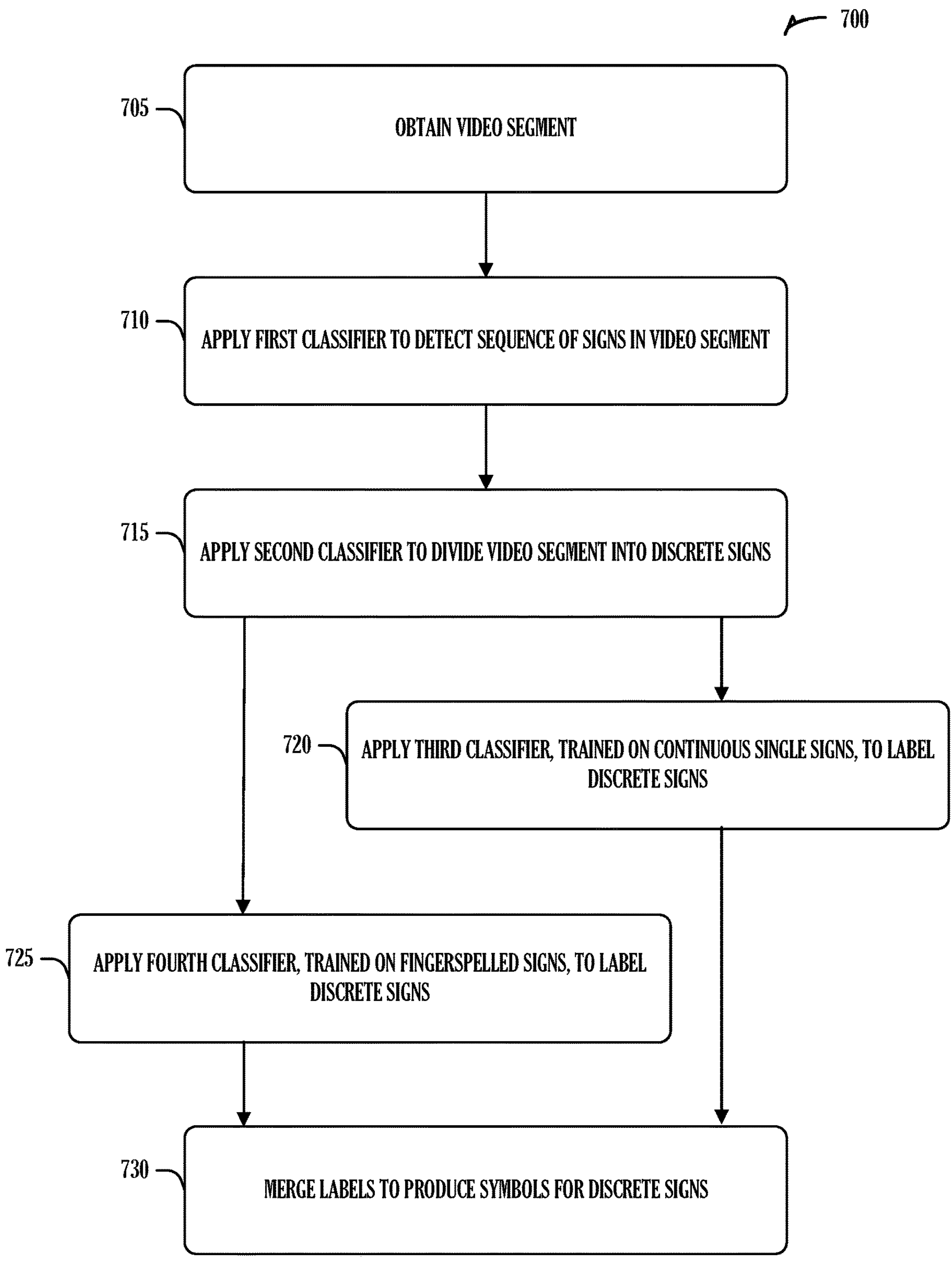
FIG. 7 illustrates a flow diagram of an example of a method for sign-language translation, according to an embodiment.

FIG. 7 illustrates a flow diagram of an example of a method 700 for sign-language translation, according to an embodiment. The operations of the method 700 are performed by computer hardware, such as that described above or below (e.g., processing circuitry).

At operation 705, a video segment that captures a sign in a sign-language is obtained (e.g., retrieved, received, etc.).

At operation 710, a first classifier is used to determine that the video segment includes a sequence of signs including the sign. In an example, the first classifier is trained only with discrete single signs. In an example, using the first classifier includes applying a pose model to the video segment to produce skeletal key points for the sign and providing the skeletal key points as input to the first classifier.

In an example, the method 700 may be expanded to include obtaining a second video segment that captures a second sign. The first classifier may be invoked to determine that the second video segment includes a single sign. In this case, the first classifier may be used to produce a symbol from the first sign.

At operation 715, a second classifier is invoked to divide the video segment into parts that correspond to discrete signs in the sequence of signs.

At operation 720, a third classifier is applied to the parts to produce a first label for the sign. In an example, the third classifier is trained on regular continuous signs. In an example, the third classifier is trained only with regular continuous signs.

At operation 725, a fourth classifier is applied to the parts to produce a second label for the sign. In an example, the fourth classifier trained on fingerspelled signs. In an example, the fourth classifier is trained only with fingerspelled signs.

At operation 730, a symbol based on the sign is produced by merging the first label and the second label. In an example, the symbol is a gloss. In an example, merging the first label and the second label includes selecting a label that indicates a detection when another label indicates no detection or selecting a label with a highest confidence score.

In an example, the first classifier, third classifier, or fourth classifier are configured to recognize custom signs. In an example, a custom sign replaces a standard sign of the sign language. In an example, the custom sign is a new sign. In an example, the second classifier is trained with a few-shot technique to recognize the new sign.

Figure 8:
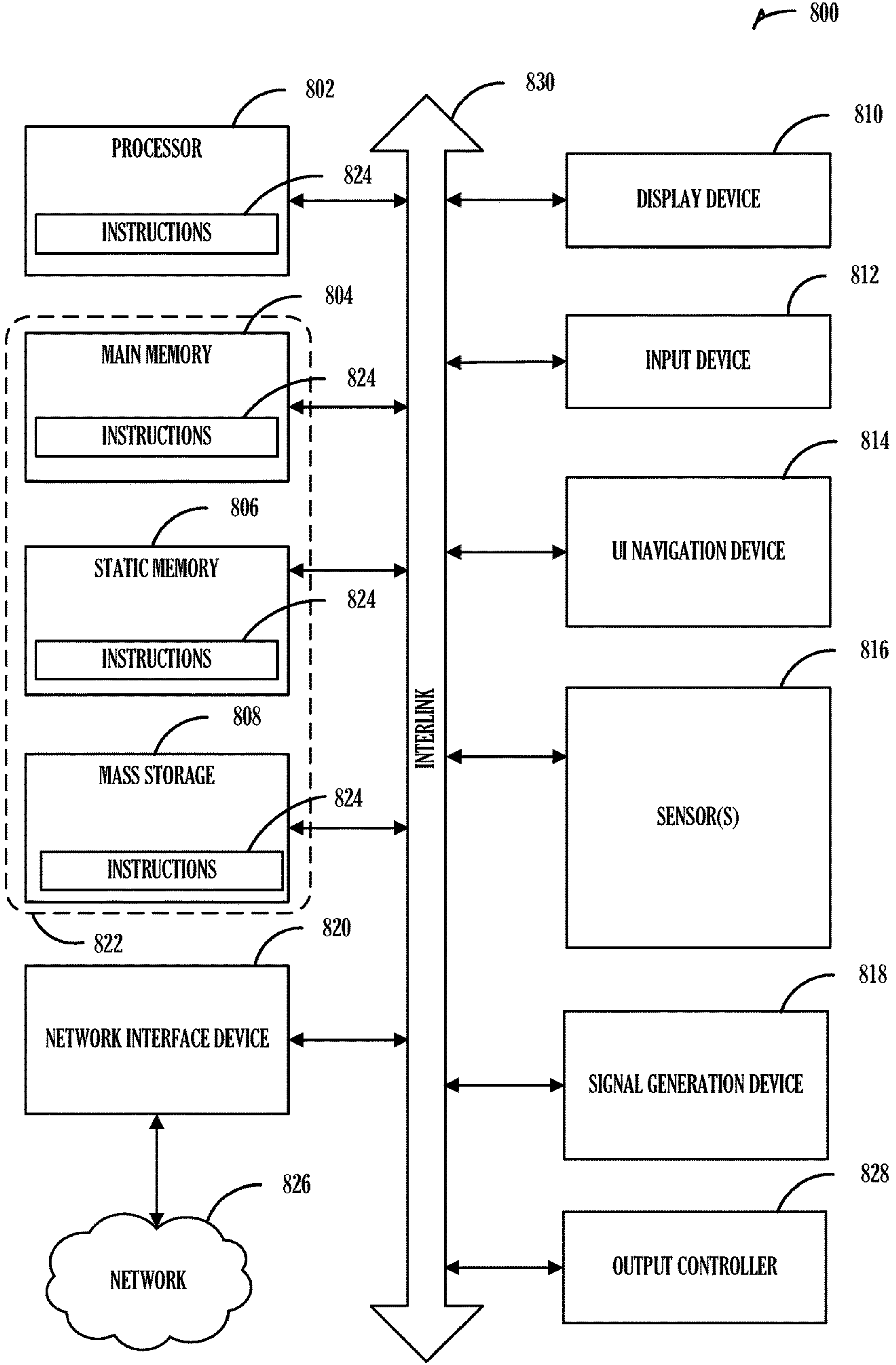
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drives, tape drives, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 822 may be representative of the instructions 824, such as instructions 824 themselves or a format from which the instructions 824 may be derived. This format from which the instructions 824 may be derived may include source code, encoded instructions (e.g., in compressed or encrypted form), packaged instructions (e.g., split into multiple packages), or the like. The information representative of the instructions 824 in the machine readable medium 822 may be processed by processing circuitry into the instructions to implement any of the operations discussed herein. For example, deriving the instructions 824 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 may include assembly, compilation, or interpretation of the information (e.g., by the processing circuitry) to create the instructions 824 from some intermediate or preprocessed format provided by the machine readable medium 822. The information, when provided in multiple parts, may be combined, unpacked, and modified to create the instructions 824. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

ADDITIONAL NOTES & EXAMPLES

Example 1 is an apparatus for sign-language translation, the apparatus comprising: a memory including instructions; and processing circuitry that, when in operation, is configured by the instructions to: obtain a video segment that captures a sign in a sign language; invoke a first classifier to determine that the video segment includes a sequence of signs including the sign; invoke a second classifier to divide the video segment into parts that correspond to discrete signs in the sequence of signs; invoke a third classifier on the parts to produce a first label for the sign, the third classifier trained on regular continuous signs; invoke a fourth classifier on the parts to produce a second label for the sign, the fourth classifier trained on fingerspelled signs; and produce a symbol based on the sign by merging the first label and the second label.

In Example 2, the subject matter of Example 1, wherein, to invoke the first classifier, the processing circuitry is configured to: apply a pose model to the video segment to produce skeletal key points for the sign; and provide the skeletal key points as input to the first classifier.

In Example 3, the subject matter of any of Examples 1-2, wherein the symbol is a gloss.

In Example 4, the subject matter of any of Examples 1-3, wherein the first classifier is trained only with discrete single signs.

In Example 5, the subject matter of any of Examples 1-4, wherein the third classifier is trained only with regular continuous signs.

In Example 6, the subject matter of any of Examples 1-5, wherein the fourth classifier is trained only with fingerspelled signs.

In Example 7, the subject matter of any of Examples 1-6, wherein, to merge the first label and the second label, the processing circuitry is configured to select a label that indicates a detection when another label indicates no detection or selecting a label with a highest confidence score.

In Example 8, the subject matter of any of Examples 1-7, where the processing circuitry is further configured to: obtain a second video segment that captures a second sign; invoke the first classifier to determine that the second video segment includes a single sign; and use the first classifier to produce a symbol from the second sign.

In Example 9, the subject matter of any of Examples 1-8, wherein the first classifier, third classifier, or fourth classifier are configured to recognize custom signs.

In Example 10, the subject matter of Example 9, wherein a custom sign replaces a standard sign of the sign language.

In Example 11, the subject matter of any of Examples 9-10, wherein the custom sign is a new sign, and wherein the second classifier is trained with a few-shot technique to recognize the new sign.

Example 12 is a method for sign-language translation, the method comprising: obtaining a video segment that captures a sign in a sign language; invoking a first classifier to determine that the video segment includes a sequence of signs including the sign; invoking a second classifier to divide the video segment into parts that correspond to discrete signs in the sequence of signs; invoking a third classifier on the parts to produce a first label for the sign, the third classifier trained on regular continuous signs; invoking a fourth classifier on the parts to produce a second label for the sign, the fourth classifier trained on fingerspelled signs; and producing a symbol based on the sign by merging the first label and the second label.

In Example 13, the subject matter of Example 12, wherein invoking the first classifier includes: applying a pose model to the video segment to produce skeletal key points for the sign; and providing the skeletal key points as input to the first classifier.

In Example 14, the subject matter of any of Examples 12-13, wherein the symbol is a gloss.

In Example 15, the subject matter of any of Examples 12-14, wherein the first classifier is trained only with discrete single signs.

In Example 16, the subject matter of any of Examples 12-15, wherein the third classifier is trained only with regular continuous signs.

In Example 17, the subject matter of any of Examples 12-16, wherein the fourth classifier is trained only with fingerspelled signs.

In Example 18, the subject matter of any of Examples 12-17, wherein merging the first label and the second label includes selecting a label that indicates a detection when another label indicates no detection or selecting a label with a highest confidence score.

In Example 19, the subject matter of any of Examples 12-18, comprising: obtaining a second video segment that captures a second sign; invoking the first classifier to determine that the second video segment includes a single sign; and using the first classifier to produce a symbol from the second sign.

In Example 20, the subject matter of any of Examples 12-19, wherein the first classifier, third classifier, or fourth classifier are configured to recognize custom signs.

In Example 21, the subject matter of Example 20, wherein a custom sign replaces a standard sign of the sign language.

In Example 22, the subject matter of any of Examples 20-21, wherein the custom sign is a new sign, and wherein the second classifier is trained with a few-shot technique to recognize the new sign.

Example 23 is at least one machine readable medium including instructions for sign-language translation, the instructions, when executed by processing circuitry, cause the processing circuitry to perform operations comprising: obtaining a video segment that captures a sign in a sign language; invoking a first classifier to determine that the video segment includes a sequence of signs including the sign; invoking a second classifier to divide the video segment into parts that correspond to discrete signs in the sequence of signs; invoking a third classifier on the parts to produce a first label for the sign, the third classifier trained on regular continuous signs; invoking a fourth classifier on the parts to produce a second label for the sign, the fourth classifier trained on fingerspelled signs; and producing a symbol based on the sign by merging the first label and the second label.

In Example 24, the subject matter of Example 23, wherein invoking the first classifier includes: applying a pose model to the video segment to produce skeletal key points for the sign; and providing the skeletal key points as input to the first classifier.

In Example 25, the subject matter of any of Examples 23-24, wherein the symbol is a gloss.

In Example 26, the subject matter of any of Examples 23-25, wherein the first classifier is trained only with discrete single signs.

In Example 27, the subject matter of any of Examples 23-26, wherein the third classifier is trained only with regular continuous signs.

In Example 28, the subject matter of any of Examples 23-27, wherein the fourth classifier is trained only with fingerspelled signs.

In Example 29, the subject matter of any of Examples 23-28, wherein merging the first label and the second label includes selecting a label that indicates a detection when another label indicates no detection or selecting a label with a highest confidence score.

In Example 30, the subject matter of any of Examples 23-29, wherein the operations comprise: obtaining a second video segment that captures a second sign; invoking the first classifier to determine that the second video segment includes a single sign; and using the first classifier to produce a symbol from the second sign.

In Example 31, the subject matter of any of Examples 23-30, wherein the first classifier, third classifier, or fourth classifier are configured to recognize custom signs.

In Example 32, the subject matter of Example 31, wherein a custom sign replaces a standard sign of the sign language.

In Example 33, the subject matter of any of Examples 31-32, wherein the custom sign is a new sign, and wherein the second classifier is trained with a few-shot technique to recognize the new sign.

Example 34 is a system for sign-language translation, the system comprising: means for obtaining a video segment that captures a sign in a sign language; means for invoking a first classifier to determine that the video segment includes a sequence of signs including the sign; means for invoking a second classifier to divide the video segment into parts that correspond to discrete signs in the sequence of signs; means for invoking a third classifier on the parts to produce a first label for the sign, the third classifier trained on regular continuous signs; means for invoking a fourth classifier on the parts to produce a second label for the sign, the fourth classifier trained on fingerspelled signs; and means for producing a symbol based on the sign by merging the first label and the second label.

In Example 35, the subject matter of Example 34, wherein the means for invoking the first classifier include: means for applying a pose model to the video segment to produce skeletal key points for the sign; and means for providing the skeletal key points as input to the first classifier.

In Example 36, the subject matter of any of Examples 34-35, wherein the symbol is a gloss.

In Example 37, the subject matter of any of Examples 34-36, wherein the first classifier is trained only with discrete single signs.

In Example 38, the subject matter of any of Examples 34-37, wherein the third classifier is trained only with regular continuous signs.

In Example 39, the subject matter of any of Examples 34-38, wherein the fourth classifier is trained only with fingerspelled signs.

In Example 40, the subject matter of any of Examples 34-39, wherein the means for merging the first label and the second label include means for selecting a label that indicates a detection when another label indicates no detection or selecting a label with a highest confidence score.

In Example 41, the subject matter of any of Examples 34-40, comprising: means for obtaining a second video segment that captures a second sign; means for invoking the first classifier to determine that the second video segment includes a single sign; and means for using the first classifier to produce a symbol from the second sign.

In Example 42, the subject matter of any of Examples 34-41, wherein the first classifier, third classifier, or fourth classifier are configured to recognize custom signs.

In Example 43, the subject matter of Example 42, wherein a custom sign replaces a standard sign of the sign language.

In Example 44, the subject matter of any of Examples 42-43, wherein the custom sign is a new sign, and wherein the second classifier is trained with a few-shot technique to recognize the new sign.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus for sign-language translation, the apparatus comprising:

a memory including instructions; and processing circuitry that, when in operation, is configured by the instructions to:

obtain a video segment that includes one or more signs in sign language;

invoke a first classifier trained to identify individual signs and produce a single symbol based on individual signs;

in response to the first classifier indicating that the video segment does not include a single sign, the processing circuitry is further configured to:

invoke a second classifier to divide the video segment into parts that correspond to discrete signs in a sequence of signs in the video segment;

in response to the second classifier dividing the video segment into parts that correspond to the discrete signs, the processing circuitry is further configured to:

invoke a third classifier on the parts of the video segment to produce first labels for the sequence of signs, the third classifier trained on regular continuous signs that are non-fingerspelled signs, each first label indicating either detection of a regular continuous sign or no detection of a regular continuous sign; and invoke a fourth classifier on the parts of the video segment to produce second labels for the sequence of signs, the fourth classifier trained on fingerspelled signs, the fingerspelled signs corresponding to hand movements representing one or more individual letters, each second label indicating either detection of a fingerspelled sign or no detection of a fingerspelled sign; and produce a sequence of symbols based on the sequence of signs by merging the first labels and the second labels.

2. The apparatus of claim 1, wherein the sequence of symbols is gloss.

3. The apparatus of claim 1, wherein the first classifier is trained with discrete single signs.

4. The apparatus of claim 1, wherein the third classifier is trained with only regular continuous signs.

5. The apparatus of claim 1, wherein the fourth classifier is trained with only fingerspelled signs.

6. The apparatus of claim 1, wherein, to merge the first labels and the second labels, the processing circuitry is configured to;

for each discrete sign, select a merged label from a respective first label of the first labels or a respective second label of the second labels, the merged label being selected based on:

one of the respective first label or the respective second label indicating detection when the other of the respective first label or the respective second label indicates no detection; or one of the respective first label or the respective second label having a higher confidence score than the other of the respective first label or the respective second label.

7. The apparatus of claim 1, wherein the processing circuitry is further configured to:

obtain a second video segment that captures a second sign;

invoke the first classifier to determine that the second video segment includes a single sign; and use the first classifier to produce a symbol from the second sign without invoking the second classifier, the third classifier, and the fourth classifier with respect to the second sign.

8. The apparatus of claim 1, wherein the first classifier, the third classifier, or the fourth classifier are configured to recognize custom signs.

9. The apparatus of claim 8, wherein a custom sign replaces a standard sign of sign language.

10. The apparatus of claim 8, wherein a custom sign is a new sign, and wherein the second classifier is trained with a few-shot technique to recognize the new sign.

11. At least one non-transitory machine readable medium including instructions for sign-language translation, the instructions, when executed by processing circuitry, cause the processing circuitry to perform operations comprising:

obtaining a video segment that includes one or more signs in sign language;

invoking a first classifier trained to identify individual signs and produce a single symbol based on individual signs;

in response to the first classifier indicating that the video segment does not include a single sign, the operations further comprise:

invoking a second classifier to divide the video segment into parts that correspond to discrete signs in a sequence of signs in the video segment;

in response to the second classifier dividing the video segment into parts that correspond to the discrete signs, the operations further comprise:

invoking a third classifier on the parts of the video segment to produce first labels for the sequence of signs, the third classifier trained on regular continuous signs that are non-fingerspelled signs, each first label indicating either detection of a regular continuous sign or no detection of a regular continuous sign; and invoking a fourth classifier on the parts of the video segment to produce second labels for the sequence of signs, the fourth classifier trained on fingerspelled signs that correspond to hand movements representing one or more individual letters, each second label indicating either detection of a fingerspelled sign or no detection of a fingerspelled sign; and producing a sequence of symbols based on the sequence of signs by merging the first labels and the second labels.

12. The at least one non-transitory machine readable medium of claim 11, wherein the sequence of symbols is gloss.

13. The at least one non-transitory machine readable medium of claim 11, wherein the first classifier is trained with discrete single signs.

14. The at least one non-transitory machine readable medium of claim 11, wherein the third classifier is trained with only regular continuous signs.

15. The at least one non-transitory machine readable medium of claim 11, wherein the fourth classifier is trained with only fingerspelled signs.

16. The at least one non-transitory machine readable medium of claim 11, wherein merging the first labels and the second labels includes, for each discrete sign, selecting a merged label from a respective first label of the first labels or a respective second label of the second labels, the merged label being selected based on:

one of the respective first label or the respective second label indicating detection when the other of the respective first label or the respective second label indicates no detection;

one of the respective first label or the respective second label having a higher confidence score than the other of the respective first label or the respective second label.

17. The at least one non-transitory machine readable medium of claim 11, wherein the operations comprise:

obtaining a second video segment that captures a second sign;

invoking the first classifier to determine that the second video segment includes a single sign; and using the first classifier to produce a symbol from the second sign without invoking the second classifier, the third classifier, and the fourth classifier with respect to the second sign.

18. The at least one non-transitory machine readable medium of claim 11, wherein the first classifier, the third classifier, or the fourth classifier are configured to recognize custom signs.

19. A system for sign-language translation, the system comprising:

means for obtaining a video segment that includes one or more signs in sign language;

means for invoking a first classifier trained to identify individual signs and produce a single symbol based on individual signs;

means for invoking a second classifier to divide the video segment into parts that correspond to discrete signs in a sequence of signs in the video segment in response to the first classifier indicating that the video segment does not include a single sign;

means for invoking a third classifier on the parts to produce first labels for the sequence of signs in response to the second classifier dividing the video segment into parts that correspond to the discrete signs, the third classifier trained on regular continuous signs that are non-fingerspelled signs, each first label indicating either detection of a regular continuous sign or no detection of a regular continuous sign;

means for invoking a fourth classifier on the parts to produce second labels for the sequence of signs in response to the second classifier dividing the video segment into parts that correspond to the discrete signs, the fourth classifier trained on fingerspelled signs corresponding to hand movements representing one or more individual letters, each second label indicating either a detection of a fingerspelled sign or no detection of a fingerspelled sign; and means for producing a sequence of symbols based on the sequence of signs by merging the first labels and the second labels.

20. The system of claim 19, comprising:

means for obtaining a second video segment that captures a second sign;

means for invoking the first classifier to determine that the second video segment includes a single sign; and means for using the first classifier to produce a symbol from the second sign without invoking the second classifier, the third classifier, and the fourth classifier with respect to the second sign.

* * * * *